United States Patent
Laffargue et al.

(10) Patent No.: US 8,854,633 B2
(45) Date of Patent: Oct. 7, 2014

(54) VOLUME DIMENSIONING SYSTEM AND METHOD EMPLOYING TIME-OF-FLIGHT CAMERA

(75) Inventors: Franck Laffargue, Toulouse (FR); Alain Gillet, Toulouse (FR); Serge Thuries, Saint Jean (FR)

(73) Assignee: Intermec IP Corp., Fort Mill, SC (US)

( * ) Notice: Subject to any disclaimer, the term of this patent is extended or adjusted under 35 U.S.C. 154(b) by 81 days.

(21) Appl. No.: 13/539,006

(22) Filed: Jun. 29, 2012

(65) Prior Publication Data

US 2014/0002828 A1  Jan. 2, 2014

(51) Int. Cl.
*G01B 11/22* (2006.01)
*G01B 11/24* (2006.01)

(52) U.S. Cl.
USPC .................. 356/627; 356/603; 250/559.21

(58) Field of Classification Search
USPC .................. 356/601–635; 382/118, 154, 143; 348/49, 164, 294; 250/223 R, 226; 235/440, 454
See application file for complete search history.

(56) References Cited

U.S. PATENT DOCUMENTS

| | | | |
|---|---|---|---|
| 5,719,678 A * | 2/1998 | Reynolds et al. | 356/627 |
| 6,061,645 A * | 5/2000 | Bengala et al. | 702/156 |
| 6,125,197 A * | 9/2000 | Mack et al. | 382/154 |
| 6,614,928 B1 * | 9/2003 | Chung et al. | 382/154 |
| 6,641,042 B1 * | 11/2003 | Pierenkemper et al. | 235/462.01 |
| 8,132,728 B2 * | 3/2012 | Dwinell et al. | 235/454 |
| 8,463,079 B2 * | 6/2013 | Ackley et al. | 382/312 |
| 8,520,220 B2 * | 8/2013 | Krakenes et al. | 356/612 |
| 2010/0208039 A1 * | 8/2010 | Stettner | 348/49 |
| 2012/0037705 A1 * | 2/2012 | Mohideen et al. | 235/462.25 |
| 2013/0027716 A1 * | 1/2013 | Melkis et al. | 356/614 |
| 2013/0293539 A1 | 11/2013 | Hunt et al. | |
| 2013/0293540 A1 | 11/2013 | Laffargue et al. | |

* cited by examiner

*Primary Examiner* — Hoa Pham
(74) *Attorney, Agent, or Firm* — Additon, Higgins & Pendleton, P.A.

(57) ABSTRACT

Volume dimensioning employs techniques to reduce multipath reflection or return of illumination, and hence distortion. Volume dimensioning for any given target object includes a sequence of one or more illuminations and respective detections of returned illumination. A sequence typically includes illumination with at least one initial spatial illumination pattern and with one or more refined spatial illumination patterns. Refined spatial illumination patterns are generated based on previous illumination in order to reduce distortion. The number of refined spatial illumination patterns in a sequence may be fixed, or may vary based on results of prior illumination(s) in the sequence. Refined spatial illumination patterns may avoid illuminating background areas that contribute to distortion. Sometimes, illumination with the initial spatial illumination pattern may produce sufficiently acceptable results, and refined spatial illumination patterns in the sequence omitted.

25 Claims, 10 Drawing Sheets

US 8,854,633 B2

VOLUME DIMENSIONING SYSTEM AND METHOD EMPLOYING TIME-OF-FLIGHT CAMERA

BACKGROUND OF THE INVENTION

1. Field

This disclosure generally relates to the field of automatic data collection (ADC) and particularly to volume dimensioning, for example useful in automatically dimensioning of target objects such as packages or parcels intended for shipment.

2. Description of the Related Art

Volume dimensioning systems are useful for providing dimensional and/or volumetric information related to three-dimensional objects. The objects may, for example take the form of parcels or packages intended for transit via a carrier (e.g., courier) or other items intended for transit. Dimensional and/or volumetric information is useful for example, in providing users with accurate shipping rates based on the actual size and volume of the object being shipped. Dimensional and/or volumetric information may be used by the carrier in selecting and scheduling appropriately sized vehicles and/or delivery routes. The ready availability of dimensional and/or volumetric information for all objects within a carrier's network assists the carrier in ensuring optimal use of available space in the many different vehicles and containers used in local, interstate, and international shipping.

Such may be of particular significant in today's economy where many businesses rely on "just in time" manufacturing. Typically, every supplier in the supply chain must be able to ship necessary components or resources on demand or with very little lead time. Thus, efficient handling of cargo is required. It does a supplier no good to have the desired goods on hand, if the supplier cannot readily ship the desired goods.

Automating volume dimensioning can speed parcel intake, improve the overall level of billing accuracy, and increase the efficiency of cargo handling. Unfortunately, parcels are not confined to a standard size or shape, and may, in fact, have virtually any size or shape. Additionally, parcels may also have specialized shipping and/or handling instructions (e.g., fragile, this side up) that must be followed during shipping or handling to protect the objects during shipping.

There exists a need for new dimensioning systems that may accurately perform volume dimensioning of objects including parcels and packages as well as other objects.

BRIEF SUMMARY

Applicants have attempted to employ time-of-flight (TOF) camera systems in volume dimensioning applications. TOF camera systems typically use a two-dimensional array of optical or photosensors (i.e., optical sensor) which are operable to sample the entire two-dimensional array concurrently or substantially simultaneously. TOF camera systems typically employ one or more illumination sources which concurrently or substantially simultaneously illuminate an entire field of view of the optical sensor with modulated illumination (e.g., light). The illumination sources provide modulated illumination, allowing active illumination by the illumination sources to be discerned from background illumination. TOF camera systems typically determine depth of an object, or portion thereof, based on the time which passes between emitting the illumination and detecting return of the illumination. In an ideal situation, a ray of light is emitted, travels to the target object, is reflected, and detected by the optical sensor. The distance between the TOF camera system and the target object is determined as a function of this transit time, the transit time being twice the distance between the TOF camera system and the target object.

TOF camera systems have a number of advantages over other, or conventional approaches. For example, TOF camera systems omit the need for a second discrete optical sensor since such do not rely on parallax for assessing depth. TOF camera systems may provide to be most cost effective and require less space than more conventional approaches.

However, Applicants have identified an inherent problem with the use of TOF camera systems in volume dimensioning applications. In particular, Applicants have identified a source of distortion which hinders the ability to accurately perform volume dimensioning. Applicants have determined that multiple reflections (i.e., multipath reflection) may give rise to distortions. In particular, illumination from an illumination source associated with the TOF camera system may first reflect from one or more surfaces adjacent or proximate a target object before then reflecting from the target object. The light may then reflect from the target object and be detected by a sensor associated with the TOF camera system. This multipath reflection phenomenon introduces background dependent distortion. Since TOF camera systems often rely on phase shift to determine distance from the TOF camera system, the multipath reflections tend to cause overestimation of depth.

Such is particularly a problem in uncontrolled environments in which the background is not known or defined before use, and may even change during use or after installation or introduction of the dimensioning system in the environment. For example, fixed dimensioning system may be sold for installation in a variety environments where the distance to walls or other sources of reflection and/or the color of those sources of reflection are not known prior to installation. Also for example, a fixed dimensioning system may be installed and the environment may change from time to time, for instance where parcels or other objects in the background are moved from time to time. As a further example, a handheld or portable dimensioning system may move relative to a fixed background environment. Thus, in many situations sources of multipath reflections may not be known prior to installation or use, or may change during use.

Applicants describe herein systems and methods which accommodate illumination to reduce the multipath reflection, and hence distortion. Those systems and methods may adjust illumination to account for multipath reflections, reducing the effect of multipath reflections when performing volume dimensioning. Those systems and methods may employ sequences of one or more illuminations and respective detections of returned illumination. In most instances, a sequence includes illumination with at least one initial spatial illumination pattern and with one or more refined spatial illumination patterns. The number of refined spatial illumination patterns in a sequence may be fixed or set, or may vary for instance based on the results of prior illumination(s) in the sequence. In some instances, illumination with the initial spatial illumination pattern may produce sufficiently acceptable results, and hence the sequence may omit illumination with any refined spatial illumination patterns. Thus, the method 1100 may include an additional determination, occurring between determination of the approximate boundary at 1106 and determination of the first refined spatial illumination pattern at 1108. This additional determination may assess the quality of the image data, avoiding illumination using refined spatial illumination patterns in those instances where illumination with the initial spatial illumination pattern produced acceptable results.

A dimensioning system operable to dimension a target object, may be summarized as including an illumination subsystem operable to successively emit a number of sequences of spatial patterns of illumination toward the target object, each of the sequences including at least an initial spatial illumination pattern and at least one refined spatial illumination pattern subsequent to the respective initial spatial illumination pattern, the refined spatial illumination pattern spatially different than the respective initial spatial illumination pattern; a sensor positioned to detect illumination returned from at least the target object; and a control subsystem communicatively coupled to the sensor and communicatively coupled to the illumination subsystem, and which determines an approximate boundary of at least a portion of the target object based at least in part of the detected illumination, determines the refined spatial illumination pattern based at least in part on the determined approximate boundary, causes the illumination subsystem to emit the at least one refined spatial illumination pattern, and determines an at least approximate volume of the target object based at least in part on illumination returned from at least the target object when illuminated by the at least one refined spatial illumination pattern.

The control subsystem may determine the refined spatial illumination pattern based at least in part on the determined approximate boundary to reduce illumination of surfaces that are not part of the target object. The approximate boundary may include at least one edge feature in an image of an illuminated area in which the target object is located and the control subsystem may further determine at least one area beyond the approximate edge which contributes to distortion and determines the refined spatial illumination pattern to reduce illumination of the at least one area which contributes to distortion. The sequences may each include one initial spatial illumination pattern of modulated illumination and at least some of the sequences may include at least two refined spatial illumination patterns of modulated illumination subsequent to the respective initial spatial illumination pattern, the refined spatial illumination patterns spatially different than the respective initial spatial illumination pattern and spatially different from one another. A first one of the refined spatial illumination patterns may have an area smaller than an illumination area of the respective initial spatial illumination pattern, and a second one of the refined spatial illumination patterns, subsequent to the first one of the refined spatial illumination patterns, may have an illumination area smaller than the illumination area of the first one of the refined spatial illumination patterns. The control subsystem may cause the illumination subsystem to apply a temporal modulation of at least one of intensity or wavelength to the initial spatial illumination pattern and the at least two refined spatial illumination patterns. The illumination subsystem may include an illumination source selectively actuatable to emit a number of two-dimensional spatial illumination patterns. The illumination subsystem may include an illumination source actuatable to emit illumination and a filter actuatable to selectively block and selectively pass the emitted illumination as a number of two-dimensional spatial illumination patterns. The illumination subsystem may include a laser illumination source and at least one scanning reflector operable to produce a two-dimensional scanning spatial pattern. The illumination subsystem may include at least one of a liquid crystal display, a liquid crystal on silicon device or a digital micromirror device. The sensor may be a two-dimensional sensor may be positioned to detect the illumination returned from the target object without use of parallax with another sensor and the control subsystem performs a time-of-flight analysis.

A method of operation in a dimensioning system to dimension a target object may be summarized as including emitting an initial spatial illumination pattern of modulated illumination toward the target object by an illumination subsystem operable to successively emit a number of sequences of spatial patterns of illumination which are modulated, each of the sequences including at least the initial spatial illumination pattern and at least one refined spatial illumination pattern of modulated illumination subsequent to the respective initial spatial illumination pattern, the at least one refined spatial illumination pattern spatially different than the respective initial illumination pattern; detecting by a sensor illumination returned from at least the target object; and determining by a control subsystem an approximate boundary of at least a portion of the target object based at least in part on the detected illumination; determining by the control subsystem the at least one refined spatial illumination pattern based at least in part on the determined approximate boundary; causing the illumination subsystem to emit the at least one refined spatial illumination pattern; and determining by the control subsystem an at least approximate three-dimensional volume of the target object based at least in part on illumination returned from at least the target object when illuminated by the at least one refined spatial illumination pattern.

Determining the refined spatial illumination pattern based at least in part on the determined approximate boundary may include determining the at least one refined spatial illumination pattern to reduce illumination of surfaces that are not part of the target object. The approximate boundary may include at least one edge feature in an image of an illuminated area in which the target object is located, and may further include determining by the control subsystem at least one area beyond the approximate edge which contributes to distortion and wherein determining the at least one refined spatial illumination pattern includes determining the at least one refined spatial illumination pattern that reduces illumination of the at least one area which contributes to distortion. At least some of the sequences may include at least a first and a second refined spatial illumination pattern subsequent to the respective initial spatial illumination pattern, the first and the second refined spatial illumination patterns spatially different than the respective initial spatial illumination pattern and different from one another, and wherein determining the at least one refined spatial illumination pattern based at least in part on the determined approximate boundary may include successively determining the first refined spatial illumination pattern and the second refined spatial illumination pattern, and causing the illumination subsystem to emit the at least one refined spatial illumination pattern may include causing the illumination subsystem to successively emit the first refined spatial illumination pattern and the second refined spatial illumination pattern, each of the first and the second refined spatial illumination patterns being modulated to be distinguishable from any ambient light. Causing the illumination subsystem to successively emit the first refined spatial illumination pattern may include causing the illumination subsystem to emit the first refined spatial illumination pattern having an illumination area smaller than an illumination area of the respective initial spatial illumination pattern, and causing the illumination subsystem to successively emit the second refined spatial illumination pattern may include causing the illumination subsystem to successively emit the second refined spatial illumination pattern having an illumination area smaller than the illumination area of the first refined spatial illumination pattern. Causing the illumination subsystem to emit the at least one refined spatial illumination pattern may include causing an illumination source to emit a number of two-dimensional illumination patterns of temporally modulated illumination. Causing the illumination subsystem to emit the at least one refined spatial illumination pattern may include causing an illumination source to emit illumination and a filter to selectively block and selectively pass the emitted illumination as a number of two-dimensional illumination patterns. Causing the illumination subsystem to emit the at least one refined spatial illumination pattern may include causing a laser illumination source and at least one scanning reflector to produce a two dimensional scanning pattern. Causing the illumination subsystem to emit the at least one refined spatial illumination pattern may include supplying control signals to at least one of a liquid crystal display, a liquid crystal on silicon device or a digital micromirror device. Determining an at least approximate three-dimensional volume of the target object based at least in part on illumination returned from at least the target object when illuminated by the at least one refined spatial illumination pattern may include determining the at least approximate three-dimensional volume of the target object based at least in part on a time-of-flight analysis of at least the emitted at least one refined spatial illumination pattern and the illumination returned from the target object when illuminated by the respective at least one refined spatial illumination pattern.

A time-of-flight based dimensioning system operable to dimension a target object may be summarized as including an illumination subsystem operable to successively emit a number of sequences of two-dimensional patterns of modulated illumination toward the target object, each of the sequences including at least an initial two-dimensional pattern of modulated illumination and at least one refined two-dimensional pattern of modulated illumination subsequent to the respective initial pattern of modulated illumination, the at least one refined two-dimensional pattern of modulated illumination spatially different than the respective initial two-dimensional pattern of modulated illumination; a two-dimensional image sensor positioned to detect illumination returned from at least the target object; and a control subsystem communicatively coupled to the image sensor to receive image information therefrom representative of the returned illumination, and which identifies edge features in the image information that correspond to physical edges of at least a portion of the target object, based at least in part on the identified edge features determines the at least one refined two-dimensional pattern of modulated illumination to reduce multipath reflection, causes the illumination subsystem to emit the at least one refined two-dimensional pattern of modulated illumination, and determines an at least approximate three-dimensional volume of the target object based at least in part on illumination returned from at least the target object when illuminated by the at least one refined two-dimensional pattern of modulated illumination.

The control subsystem may further determine at least one area beyond the identified edge features which contributes to the multipath reflection and determines the refined two-dimensional pattern of modulated illumination to reduce illumination of the at least one area which contributes to multipath reflection. The control subsystem may determine at least two refined two-dimensional patterns of modulated illumination for each of at least one of the sequences, the at least two refined two-dimensional patterns of modulated illumination spatially different than the respective initial two-dimensional pattern of modulated illumination, a first one of the refined two-dimensional patterns of modulated illumination having a respective illumination area smaller than an respective illumination area of the initial two-dimensional pattern of modulated illumination and a second one of the refined two-dimensional patterns of modulated illumination having a respective illumination area smaller than the respective illumination area of the first one of the two-dimensional patterns of modulated illumination. The control subsystem may determine the at least approximate three-dimensional volume of the target object based at least in part on a time-of-flight analysis of at least the emitted at least one refined two-dimensional pattern of modulated illumination and the illumination returned from the target object when illuminated by the respective at least one refined two-dimensional pattern of modulated illumination.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE INVENTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with volume dimensioning systems, time-of-flight (TOF) camera systems, communications systems, and/or automatic data collection (ADC) readers have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

Figure 1:
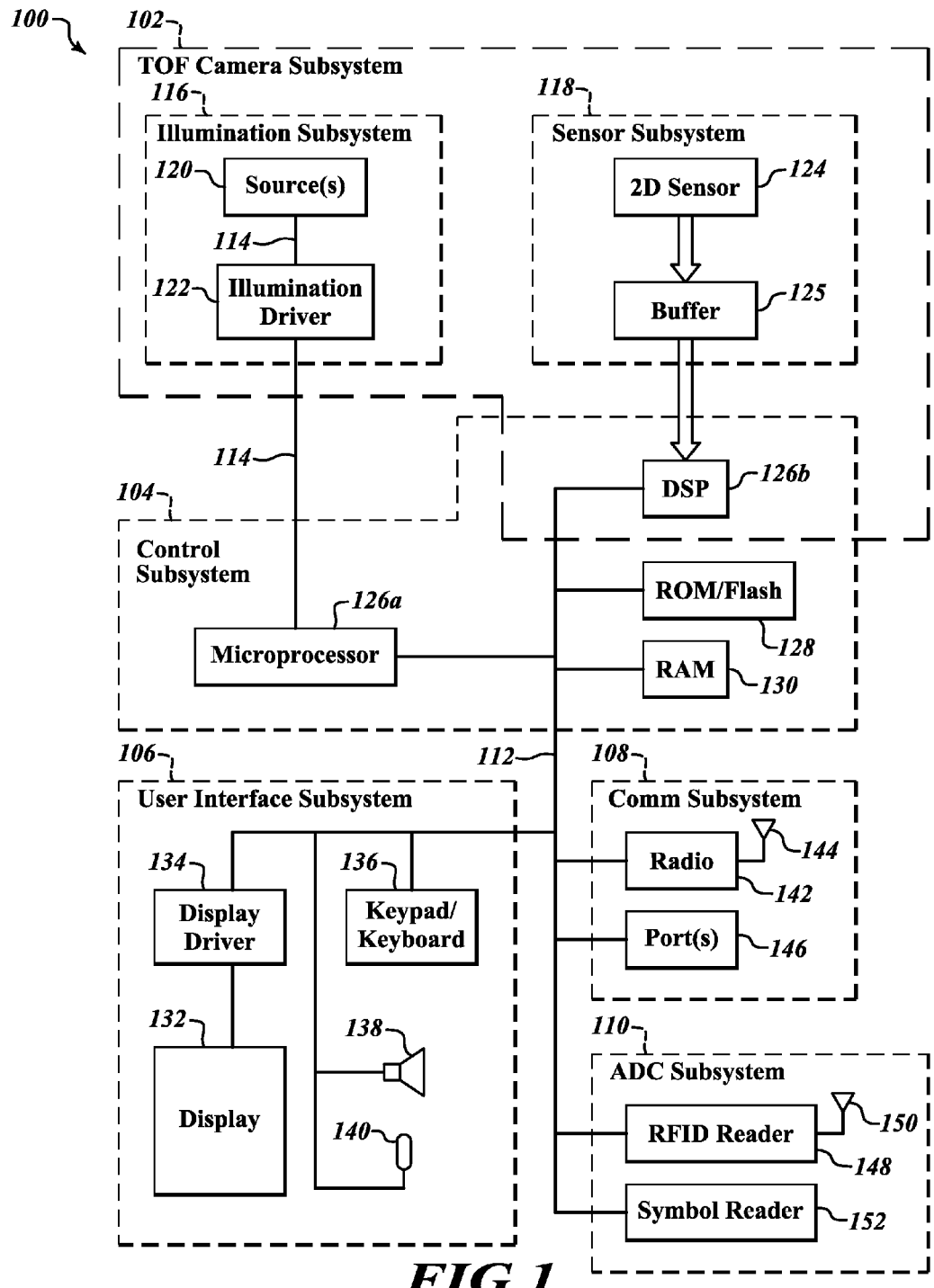
FIG. 1 is a block diagram of a volume dimensioning system, according to one illustrated embodiment.

FIG. 1 shows a volume dimensioning system 100, according to one illustrated embodiment.

The volume dimensioning system 100 includes a time-of-flight (TOF) camera subsystem 102 and control subsystem 104. The volume dimensioning system 100 optionally includes a user interface (UI) subsystem 106, communications subsystem 108 and/or automatic data collection (ADC) subsystem 110.

The various subsystems 102-110 may be communicatively coupled by one or more couplers (e.g., electrically conductive paths, wires, optical fibers), for example via one or more buses 112 (only one shown) and/or control lines 114 (only two shown). The buses 112, or other couplers 114, may include power buses or lines, data buses, instruction buses, address buses, etc., which allow operation of the various subsystems 102-110 and interaction therebetween. The various subsystems 102-110 are discussed in turn, below. While various individual components are generally easily categorizable into one or another of the subsystems, some components may be optionally implemented in one or two or more of the subsystems 102-110. Thus, some components may be illustrated in FIG. 1 as part of two or more subsystems 102-110.

The TOF camera subsystem 102 includes an illumination subsystem 116 to provide or emit illumination outward from the volume dimensioning system 100 into an environment containing a target object (not shown in FIG. 1) and a sensor subsystem 118 to receive illumination returned (e.g., reflected, fluoresced) from at least the target object.

The illumination subsystem 116 includes an illumination device 120. The illumination device 120 typically takes the form of a two-dimensional array of individually addressable or controllable elements, but may take a variety of forms, for example the forms set out in FIGS. 2-4 and discussed below. The illumination subsystem 116 will typically include an illumination driver 122 which is coupled to control the individually addressable or controllable elements of the illumination device 120. Alternatively, the illumination device 120 may be controlled directly by the control subsystem 104 without the use of a dedicated illumination driver 122.

In particular, the illumination device 120 is controlled to produce or emit modulated light in a number of spatial or two-dimensional patterns. Illumination may take the form of a large variety of wavelengths or ranges of wavelengths of electromagnetic energy. For instance, illumination may include electromagnetic energy of wavelengths in an optical range or portion of the electromagnetic spectrum including wavelengths in a human-visible range or portion (e.g., approximately 390 nm-750 nm) and/or wavelengths in the near-infrared (NIR) (e.g., approximately 750 nm-1400 nm) or infrared (e.g., approximately 750 nm-1 mm) portions and/or the near-ultraviolet (NUV) (e.g., approximately 400 nm-300 nm) or ultraviolet (e.g., approximately 400 nm-122 nm) portions of the electromagnetic spectrum. The particular wavelengths are exemplary and not meant to be limiting. Other wavelengths of electromagnetic energy may be employed.

Various illumination devices 120 are discussed below, with reference to FIGS. 2, 3 4A and 4B.

The sensor subsystem 118 includes a transducer or sensor 124, typically a two-dimensional array of photo-sensitive or photo-responsive elements, for instance a two-dimensional array of photodiodes or a two-dimensional array of charge coupled devices (CODs). The sensor subsystem 118 may optionally include a buffer 125 communicatively coupled to the sensor 124 to receive image data measured, captured or otherwise sensed or acquired by the sensor 124. The buffer 125 may temporarily store image data until the image data is processed.

The control subsystem 104 includes one or more controllers, for example one or more microprocessors (one shown) 126a, digital signal processor (DSP) 126b, application specific integrated circuit (ASIC), programmable gate array (PGA), programmable logic controller (PLC) (collectively 126). While the DSP 126b may be considered and/or provided or packaged as part of the control subsystem 104, the DSP 126b may in some applications be may be considered and/or provided or packaged as part of the TOF camera subsystem 102.

The control subsystem 104 includes one or more nontransitory computer- or processor-readable storage media. For example, the control subsystem 104 may include nonvolatile memory, for instance read only memory (ROM) or NAND Flash memory 128. Additionally or alternatively, the control subsystem 104 may include volatile memory, for instance dynamic random access memory (ROM) 130. The ROM, NAND Flash memory and/or RAM 128, 130 may store computer- or processor executable instructions and/or data, which cause the microprocessor, DSP or other microcontroller to perform volume dimensioning, for example by executing the various acts described herein.

The UI subsystem 106 may include one or more user interface components which provide information to a user and/or allow a user to input information and/or control operation of the volume dimensioning system 100.

For example, the UI subsystem 106 may include a display 132 to visually provide information and/or control elements to the user. The display 132 may, for example, take the form of a liquid crystal display (LCD) panel. The display 132 may, for example, take the form of a touch sensitive display, allowing the display of user selectable icons (e.g., virtual keypad or keyboard, graphical user interface or GUI elements) in addition to the display of information. The display 132 may be coupled to the control subsystem 104 via a display driver 134 or similar component. The display driver 134 may control the presentation of information and icons on the display 132. The display driver 134 may additionally process signals indicative of user inputs made via the display 132.

The UI subsystem 106 may optionally include a physical keypad or keyboard 136, which allows a user to enter data and instructions or commands. The physical keypad or keyboard 136 may be integral to a housing (not shown) of the volume dimensioning system 100. Alternatively, the optional physical keypad or keyboard 136 may be separate from the housing, communicatively coupled thereto via a wireless connection or wired connection for instance a Universal Serial Bus (USB®) interface.

The UI subsystem 106 may optionally include a speaker 138 to provide audible information, cues and/or alerts to a user. The UI subsystem 106 may optionally include a microphone 140 to receive spoken information, instructions or commands from a user.

The communications subsystem 108 may include one or more wireless communications components and/or one or more wired communications components to allow communications with devices external from the volume dimensioning system 100.

For example the communications subsystem 108 may include one or more radios (e.g., transmitters, receivers, transceivers) 142 and associated antenna(s) 144. The radio(s) 142 may take any of a large variety of forms using any of a large variety of communications protocols, for instance IEEE 802.11, including WI-FI®, BLUETOOTH®, various cellular protocols for instance CDMA, TDMA, GSM.

Also for example, the communications subsystem 108 may include one or more communications ports 146. The communications ports 146 may take any of a large variety of forms, for example wired communications ports for instance ETHERNET® ports, USB® ports, FIREWIRE® ports, THUNDERBOLT® ports, etc. The communications ports 146 may even take the form of wireless ports, for instance an infrared transceiver.

The ADC subsystem 110 may include one or more ADC readers to perform automatic data collection activities, for instance with respect to a target object.

For example, the ADC subsystem 110 may include a radio frequency identification (RFID) reader or interrogator 148 and associated antenna 150 to wireless read and/or write to wireless transponders (e.g., RFID tags or transponders) (not shown). Any of a large variety of RFID readers or interrogators 148 may be employed, including fixed or stationary RFID readers or portable or handheld RFID readers. RFID reader(s) 148 may be used to read information from a transponder physically or at least proximally associated with a target object (not shown in FIG. 1). Such information may, for instance, include recipient information including an address and/or telephone number, sender information including an address and/or telephone number, specific handling instructions (e.g., fragile, keep a give side up, temperature range, security information). The RFID reader 148 may also write information to the transponder, for instance information indicative of a time and/or place at which the transponder was read, creating a tracking record.

Also for example, the ADC subsystem 110 may include a machine-readable symbol reader 152 to wireless read machine-readable symbols (e.g., one-dimensional or barcode symbols, two-dimensional or matrix code symbols) (not shown). Any of a large variety of machine-readable symbol readers 152 may be employed. For example, such may employ scanner based machine-readable symbol readers 152 such as those that scan a point of light (e.g., laser) across a symbol and detector light returned from the symbol, and decoding information encoded in the symbol. Also for example, such may employ imager based machine-readable symbol readers 152 such as those that employ flood illumination (e.g., LEDs) of a symbol, detect or capture an image of the symbol, and decode information encoded in the symbol. The machine-readable symbol reader(s) 152 may include fixed or stationary machine-readable symbol readers or portable or handheld machine-readable symbol readers. machine-readable symbol reader(s) 152 may be used to read information from a machine-readable symbol physically or at least proximally associated with a target object. Such information may, for instance, include recipient information including an address and/or telephone number, sender information including an address and/or telephone number, specific handling instructions (e.g., fragile, keep a give side up, temperature range, security information).

While not illustrated, the volume dimensioning system 100 may include a self contained, discrete source of power, for example one or more chemical battery cells, ultracapacitor cells and/or fuel cells. While also not illustrated, the volume dimensioning system 100 may include a recharging circuit, for example to recharge secondary chemical battery cells. Alternatively or additionally, the volume dimensioning system 100 may be wired to an external power source, such as mains, residential or commercial power.

Figure 2:
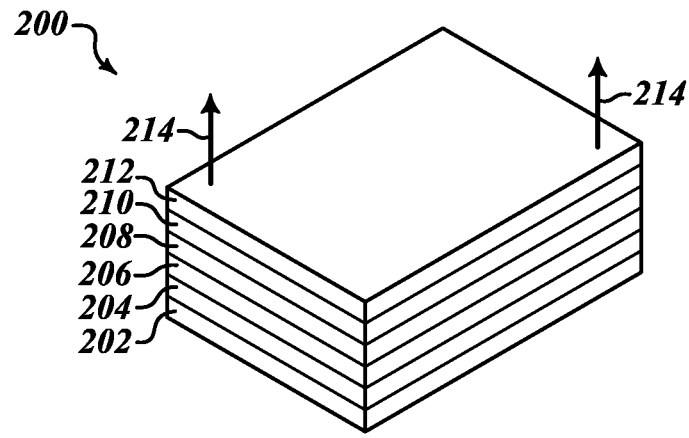
FIG. 2 is an isometric view of a liquid crystal display (LCD) device that forms at least part of an illumination subsystem of a volume dimensioning system, according to one illustrated embodiment.

FIG. 2 shows a liquid crystal display (LCD) device 200 that may be used as the illumination device 120 of the illumination subsystem 116 of the volume dimensioning system 100, according to one illustrated embodiment.

The LCD device 200 may take any of a large variety of forms, an exemplary one of which is illustrated in FIG. 2. The illustrated LCD device 200 may include a florescent panel 202 as a light source (e.g., LED(s), florescent, incandescent), first polarizing filter 204, set of liquid crystal cells 206, color filters 208, second polarizing filter 210, and front panel (e.g., glass) 212. Illumination travels from the florescent panel 202 toward, and out from the front panel 212, generally as illustrated by arrows 214. The LCD device 200 may produce or emit spatial or two-dimensional patterns of illumination which illumination is modulated to be distinguishable, for instance from ambient light.

Figure 3:
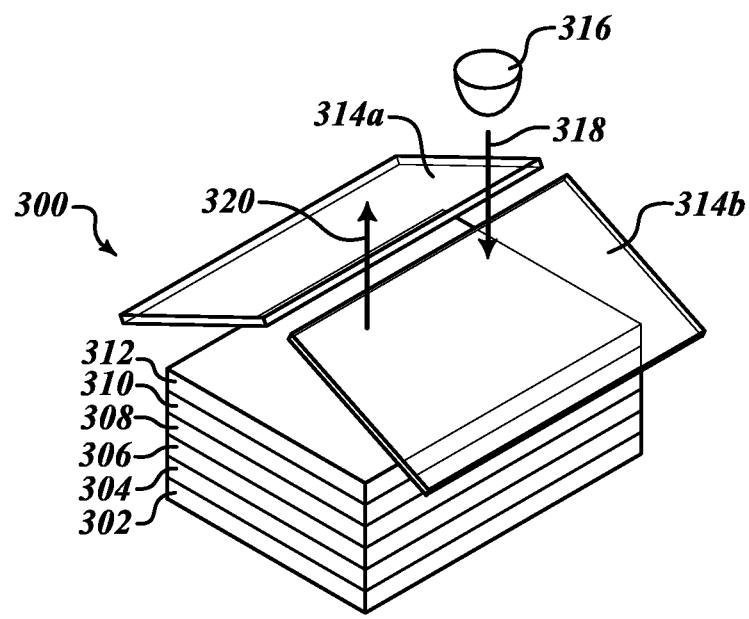
FIG. 3 is an isometric view of a liquid crystal on silicon (LCOS) device that forms at least part of an illumination subsystem of a volume dimensioning system, according to one illustrated embodiment.

FIG. 3 shows a liquid crystal on silicon (LCoS) device 300 that may be used as the illumination device 120 of the illumination subsystem 116 of the volume dimensioning system 100, according to one illustrated embodiment.

The LCoS device 300 may take any of a large variety of forms, an exemplary one of which is illustrated in FIG. 3. The illustrated LCoS device 300 may include drive circuitry (e.g., CMOS) 302, reflective coating 304, liquid crystal cells 306, alignment layer 308, transport electrodes 310, cover glass 312, polarizers 314a, 314b (collectively 314), and light source(s) 316. Illumination 318 travels from the light source 316 toward the reflective coating 304, and is then returned or reflected back outward as illumination 320 by the reflective coating 304. The LCoS device 300 may produce or emit spatial or two-dimensional patterns of illumination which illumination is modulated to be distinguishable, for instance from ambient light.

Figure 4A:
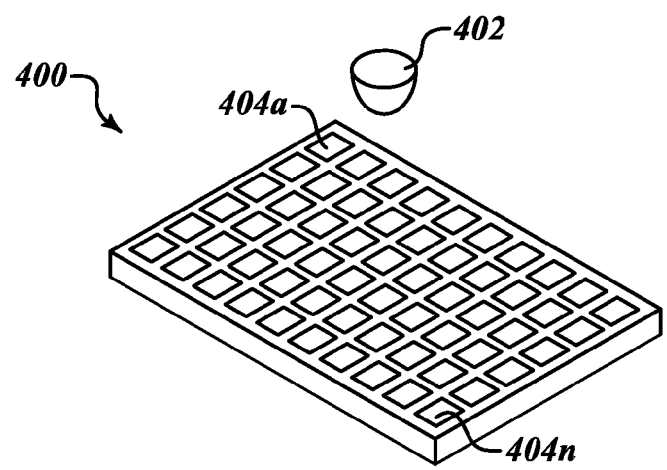
FIG. 4A is an isometric view of a digital micromirror device (DMD) that forms at least part of an illumination subsystem of a volume dimensioning system, according to one illustrated embodiment.

FIG. 4A shows a digital micromirror device (DMD) 400 that may be used as the illumination device 120 of the illumination subsystem 116 of the volume dimensioning system 100, according to one illustrated embodiment.

The DMD 400 may take any of a large variety of forms, an exemplary one of which is illustrated in FIG. 4. The illustrated DMD 400 may include a light source 402 (e.g., LED(s), florescent, incandescent) and an array of micromirror 404a-404n (collectively 404) positioned to and operable to selectively reflect illumination from the light source 402. The array of micromirror 404 may, for example, include one hundred thousand aluminum micromirror, each with a diameter or approximately 16 µm. Each micromirror 404a-404n is supported by a respective pedestal (not shown) from a respective yoke (not shown) with a torsion spring (not shown), that allow the micromirror 404a-404n to rotate some defined amount in a positive and a negative direction about an axis, which corresponds to ON and OFF states. The DMD 400 includes drive circuitry (not shown) such as SRAM, that generates electrostatic charges via electrodes to attract and/or repulse portions of the yoke and/or micromirror 404, causing pivoting. Illumination travels from the light source 402 and is reflected back outwards by the micromirror 404 dependent on the specific orientation of each respective micromirror 404 at any given time. The DMD 400 may produce or emit spatial or two-dimensional patterns of illumination which illumination is modulated to be distinguishable, for instance from ambient light.

Figure 4B:
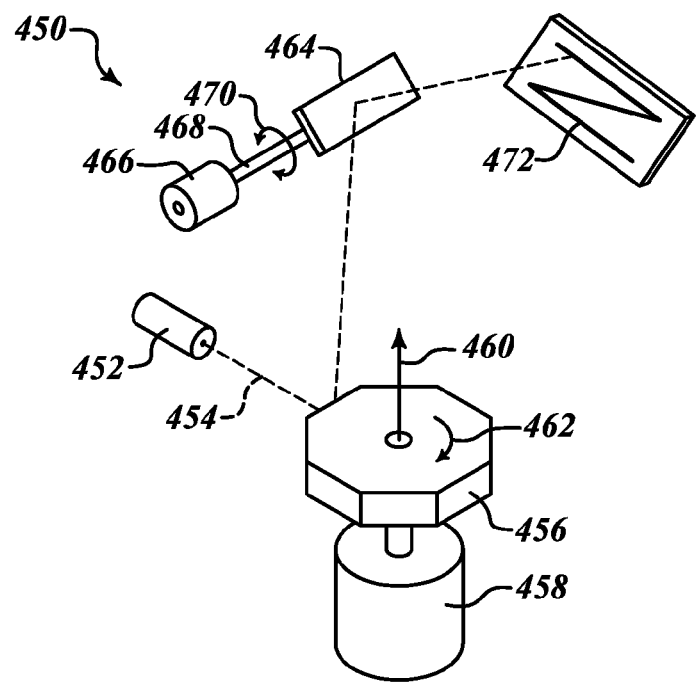
FIG. 4B is an isometric view of a scanning laser assembly that forms at least part of an illumination subsystem of a volume dimensioning system, according to one illustrated embodiment.

FIG. 4B shows a scanning laser assembly 450 that may be used as the illumination device 120 of the illumination subsystem 116 of the volume dimensioning system 100, according to one illustrated embodiment.

The scanning laser assembly 450 includes a laser source 452, for example a laser diode that produces a coherent beam of light 454. The scanning laser assembly 450 includes one or more reflectors. For example, the scanning laser assembly 450 may include a rotating polygonal mirror 456 driven by an actuator such as an electric motor 458, to rotate about an axis 460 as indicated by single headed arrow 462. Also for example, the scanning laser assembly 450 may include and an oscillating mirror or dichroic reflector 464 driven by an actuator, such as an electric motor 466 to pivot about an axis 468 as indicated by double headed arrow 470. The reflector(s) 456, 464 cause the laser light to scan a two-dimensional pattern, for example a raster scan pattern 472. A limit of travel in a vertical and horizontal direction is controlled to adjust or refine one or more dimensions of the illumination. The scanning laser assembly 450 may produce or emit spatial or two-dimensional patterns of illumination which illumination is modulated to be distinguishable, for instance from ambient light.

While a number of exemplary illumination subsystems have been illustrated and described, the volume dimensioning system 100 may employ other illumination subsystems capable of producing spatially configurable two-dimensional or spatial patterns of modulated illumination.

Figure 5:
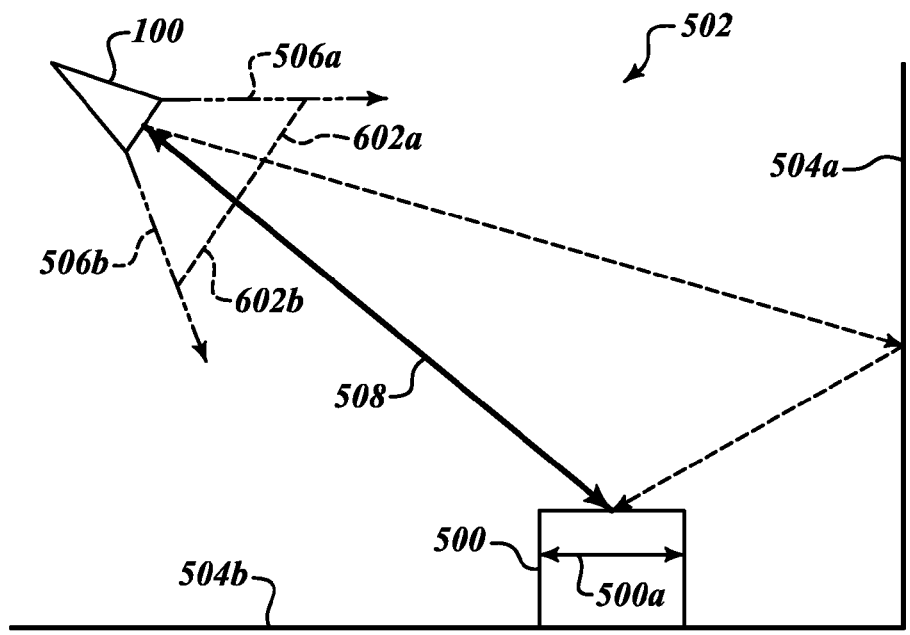
FIG. 5 is a schematic view of a volume dimensioning system illuminating a target object in a background environment with an initial spatial pattern of illumination as part of a first sequence of illumination, according to one illustrated embodiment.

FIG. 5 shows a volume dimensioning system 100 illuminating a target object 500 with an initial spatial pattern of modulated illumination 600 (FIG. 6) in a background environment 502 which includes a number of reflecting surfaces 504a, 504b, according to one illustrated embodiment.

As illustrated by rays 506a, 506b, the volume dimensioning system 100 produces or emits the initial spatial pattern of modulated illumination 600 (FIG. 6) with at least one dimension 602a, 602b, 602c, 602d (collectively 602) that is relatively wide with respect to the size of a corresponding dimension 500a of the target object 500.

A similar overly wide illumination affect may occur in the depth dimension (into the drawing sheet) of FIG. 5 as well. Some of the illumination, represented by double headed ray 508 travels directly from the volume dimensioning system 100 to the target object 500, and is returned directly to the volume dimensioning system 100 from the target object 500. The distance traveled by this illumination 508 is approximately twice the distance between the volume dimensioning system 100 and the target object 500 and would typically allow the volume dimensioning system 100 to produce highly accurate depth dimension therefrom.

However, some of the illumination, represented by rays 510a, 510b (collectively 510), travels indirectly from the volume dimensioning system 100 to the target object 500. A first one of the rays 510a illuminates one of the surfaces 504a in the background environment 502, before being reflected or returned by the surface 504a to the target object as a second one of the rays 510b. The illumination is then reflected or returned from the target object 500 to the volume dimensioning system 100, for example via the same path as ray 508.

Figure 7:
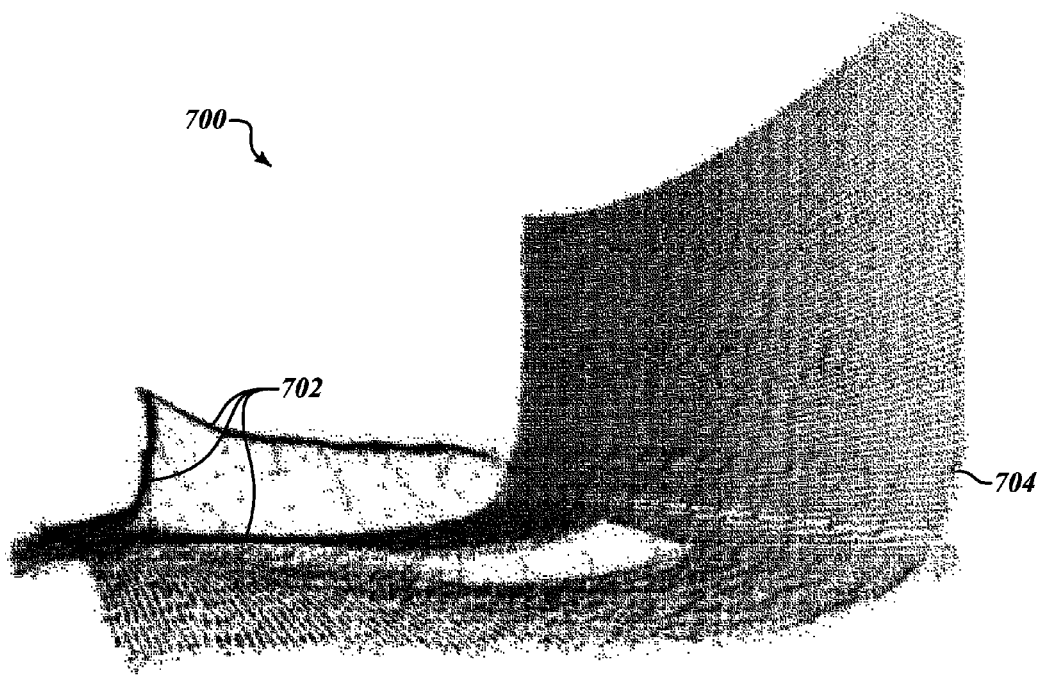
FIG. 7 is screen print showing image data as sensed by the volume dimensioning system when a target object and background environment is illuminated with the initial spatial pattern of illumination, according to one illustrated embodiment.

While illustrated as what may appear to be walls and a floor, these surfaces can take any of a large variety of forms, including other objects such as parcels or packages, or machines, counters, etc. in the background environment 502. The distance traveled via the indirect path is more than twice the distance between the volume dimensioning system 100 and the target object. Thus, the received illumination returned via the indirect path results in a phase mismatch, and creates distortion in the image data 700 (FIG. 7). Such is illustrated in FIG. 7 where a boundary or edge feature in an image 700 of the target object 500 is identified by reference number 702 and the distortion by reference number 704.

Figure 6:
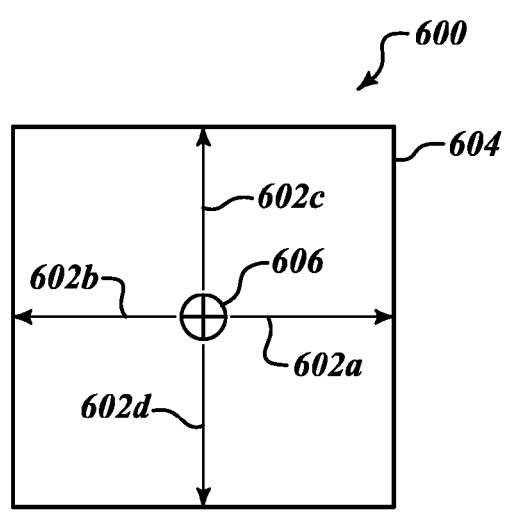
FIG. 6 is a plan view showing an exemplary initial spatial pattern of illumination, according to one illustrated embodiment.

With respect to FIG. 6, the two-dimensional initial pattern of modulated illumination 600 illustrated therein is exemplary to provide context for this description. The initial spatial pattern of modulated illumination 600 can have a perimeter 604. The perimeter 604 may, for example have a square shape, or have any of a large variety of other shapes, including other polygonal shapes (e.g., hexagonal, octagonal, rhombus, U-shaped) or non-polygonal shapes (circular, oval). The spatial pattern of modulated illumination 600 should not be limited to any particular geometrical shape. Almost any shape can be obtained by controlling individual addressable or controllable light sources or emitters, mirrors (i.e., any reflector), liquid crystal elements and/or filter elements. A center 606 of the initial spatial pattern of modulated illumination 600 is identified for use in comparison with FIG. 9, and to show that one or more dimensions may change or be refined with respect to the center 606.

Figure 8:
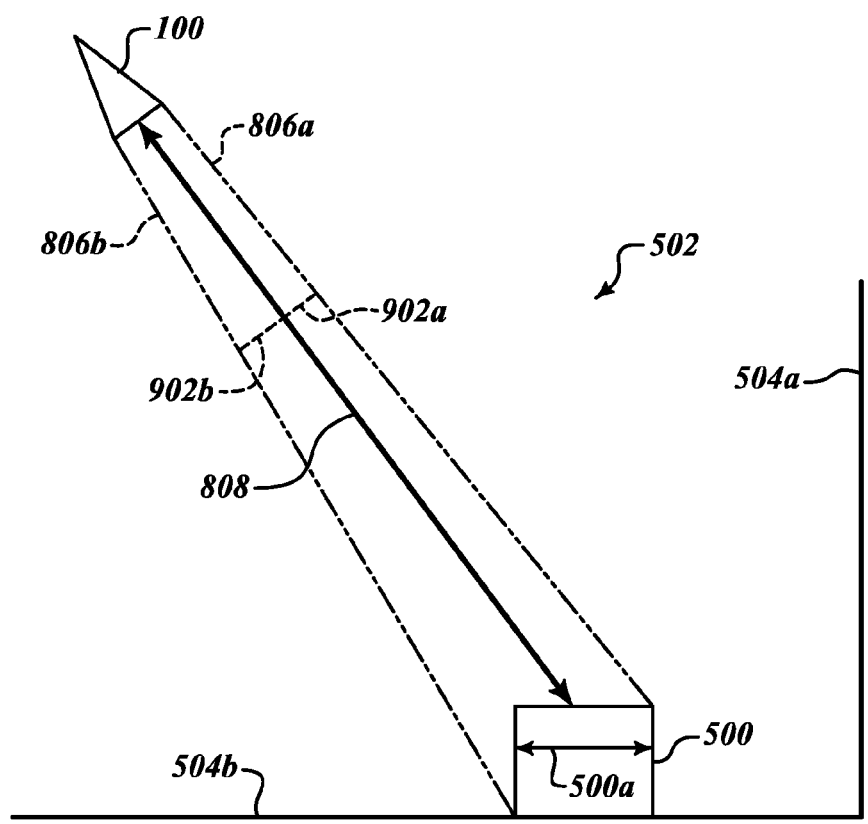
FIG. 8 is a schematic view of a volume dimensioning system illuminating a target object in a background environment with a refined spatial pattern of illumination as part of the first sequence of illumination, according to one illustrated embodiment.

FIG. 8 shows a volume dimensioning system 100 illuminating the target object 500 with a refined spatial pattern of modulated illumination 900 (FIG. 9) in the background environment 502 which includes the reflecting surfaces 504a, 504b, according to one illustrated embodiment.

As illustrated by rays 806a, 806b, the volume dimensioning system 100 produces or emits a refined spatial pattern of modulated illumination 900 (FIG. 9) with at least one dimension 902a, 902b, 902c, 902d (collectively 902) that is adjusted or refined to reduce an amount of illumination returned by surfaces 504a, 504b other than the target object 500. As described in detail below, the adjustment or refinement may be based at least in part on the image 700 resulting from previous illumination, for example a previous illumination with the initial spatial pattern of modulated illumination 600 (FIG. 6).

Figure 10:
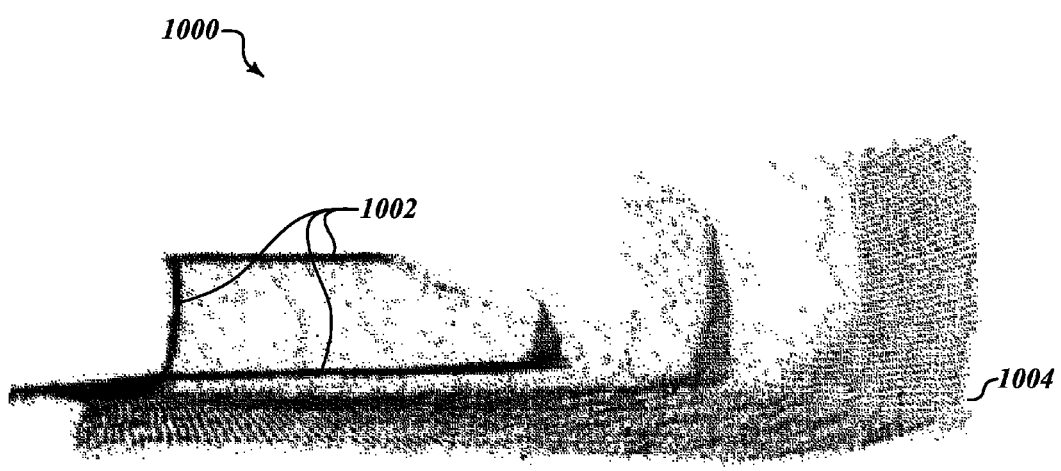
FIG. 10 is screen print showing image data as sensed by the volume dimensioning system when a target object and background environment is illuminated with the refined spatial pattern of illumination, according to one illustrated embodiment.

A similar adjustment or refinement may be made in the depth dimension (into drawing sheet) of FIG. 8 as well. Most, if not all, of the illumination, represented by double headed ray 808 travels directly from the volume dimensioning system 100 to the target object 500, and is returned directly to the volume dimensioning system 100 from the target object 500. The distance traveled by this illumination 808 is approximately twice the distance between the volume dimensioning system 100 and the target object and would typically allow the volume dimensioning system 100 to produce highly accurate depth dimension therefrom. Elimination or reduction of illumination of surfaces 504a, 504b other than the target object 500, and particularly surfaces 504a that cause a relatively high level of distortion in the image data 1000 (FIG. 10) can result in more accurate volume dimensioning. Such is illustrated in FIG. 10 where a boundary or edge feature in an image 1000 of the target object 500 is identified by reference number 1002 and the distortion by reference number 1004. Comparison of FIG. 10 with FIG. 7 demonstrates the significant reduction in distortion and the resulting increase in clarity of the boundary or edge features of the target object 500 in the image 1000 of the target object 500.

Figure 9:
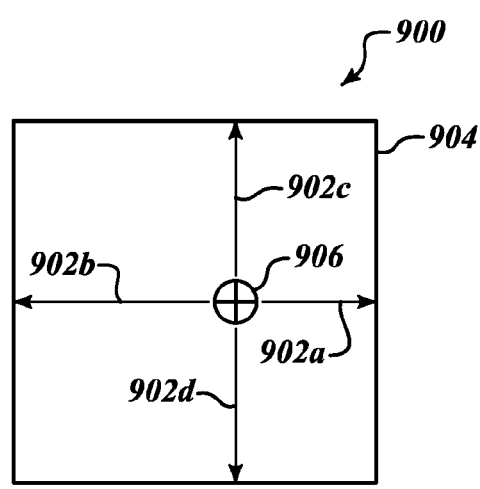
FIG. 9 is a plan view showing an exemplary refined spatial pattern of illumination, according to one illustrated embodiment.

With respect to FIG. 9, the two-dimensional refined pattern of modulated illumination 900 illustrated therein is exemplary to provide context for this description. The refined spatial pattern of modulated illumination 900 can have a perimeter 804. The perimeter 904 may, for example have a square or rectangular shape, or have any of a large variety of other shapes, including other polygonal shapes (e.g., hexagonal, octagonal, rhombus, U-shaped) or non-polygonal shapes (circular, oval). The spatial pattern of modulated illumination 900 should not be limited to any particular geometrical shape. Almost any shape can be obtained by controlling individual addressable or controllable light sources or emitters, mirrors (i.e., any reflector), liquid crystal elements and/or filter elements. A center 906 of the refined spatial pattern of modulated illumination 900 is identified for use in comparison with FIG. 6, and to show that one or more dimensions may change or be refined with respect to the center 906. Where the center 606 and the center 906 are matched, it is notable that three dimensions have changed. Notable a first dimension 602a, 902a is reduced by a first amount, a second dimension 602c, 902c is reduced by a second amount, and a third dimension 602d, 902d is reduced by the second amount as well. This reduction in certain dimensions may advantageously reduce the illumination of extraneous surfaces that contribute to distortion or noise.

Figure 11:
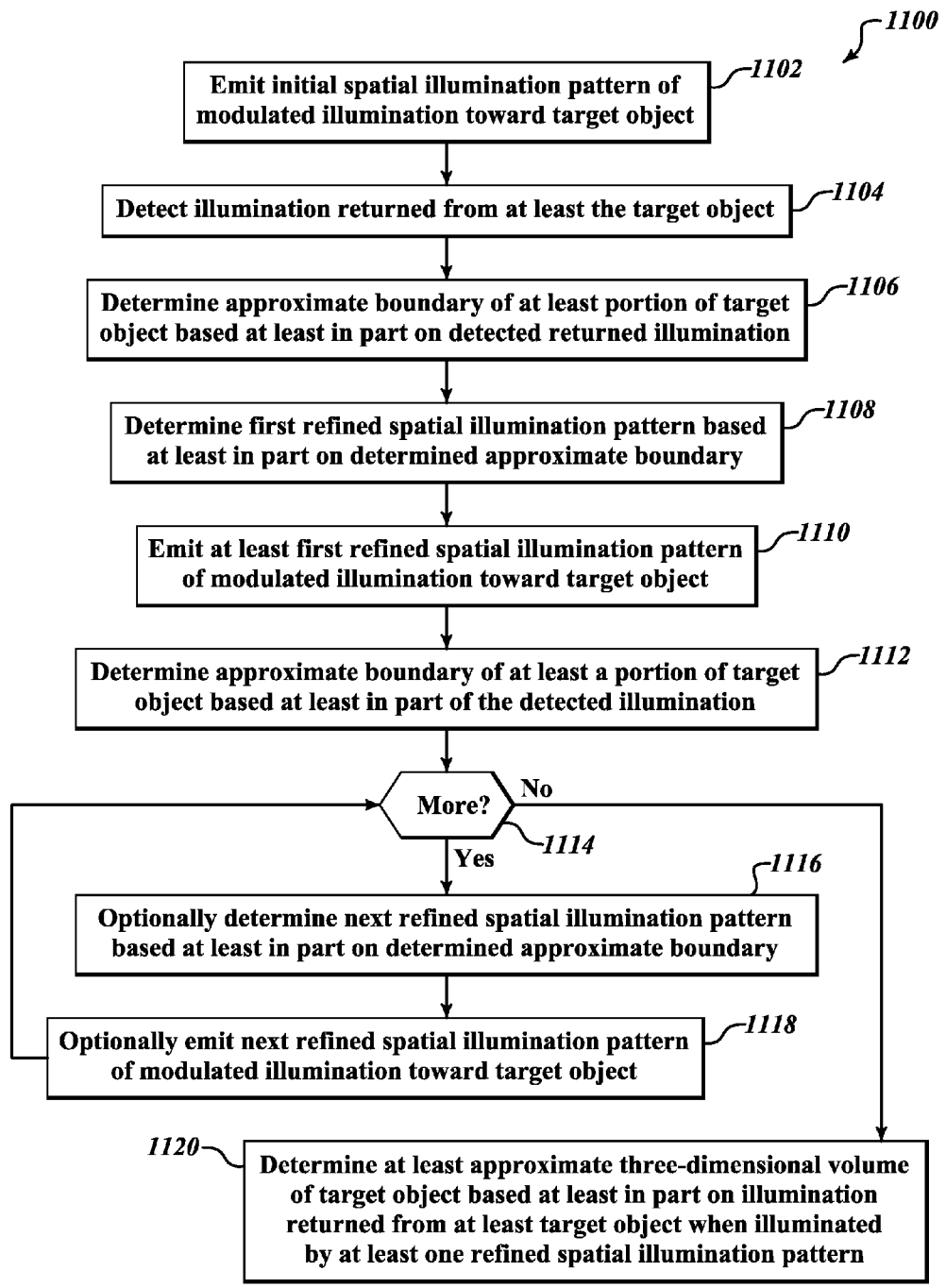
FIG. 11 is a flow diagram showing a high level method of operation in a volume dimensioning system, according to one illustrated embodiment.

FIG. 11 shows a high level method 1100 of operation of a volume dimensioning system, according to one illustrated embodiment.

At 1102, an illumination subsystem emits an initial spatial illumination pattern of illumination in a sequence of illumination which will include an initial spatial illumination pattern and typically at least one refined spatial illumination pattern. The illumination is emitted outward of the volume dimensioning system, which when oriented toward a target object will illuminate at least part of the target object. The illumination is preferably modulated to be distinguishable from any ambient light. The modulation may take the form of a variation in intensity and/or wavelength, or some other form of modulation. The illumination may be temporally modulated to essentially encode a recoverable and recognizable signal or pattern (e.g., time varying change of an optical characteristic) in the illumination which is discernible in detected illumination returned from the target object. As described above, a large variety of illumination components may be employed to produce the illumination.

At 1104, a sensor of a sensor subassembly detects illumination returned from at least the target object. As described above, the sensor is typically a two-dimensional sensor array. The use of flight-of-time techniques allow recovery of three-dimensional data, including depth with respect to the field of view of the sensor (e.g., normal to the field of view). Such is advantageously achievable without requiring multiple sensors and without employing parallax.

At 1106, a processor of a control subsystem or other processor determines an at least approximate boundary of at least a portion of the target object. The processor may determine such based at least in part on detected illumination. The processor may employ various image processing techniques, for example various edge detection filters (e.g., Sobel).

At 1108, the processor of a control subsystem or other processor determines a first refined spatial illumination pattern based at least in part on the determined approximate boundary spatially different than initial spatial illumination pattern.

At 1110, the illumination subsystem emits at least the first refined spatial illumination pattern in a sequence of illumination. Again, the illumination is emitted outward of the volume dimensioning system. Again, the illumination is modulated to be distinguishable from any ambient light.

At 1112, the processor of a control subsystem or other processor determines an approximate boundary of at least a portion of the target object based at least in part of the detected illumination. In this case, the image data being analyzed is the result of the first refined spatial illumination pattern, hence may have significantly less distortion and thus produce more accurate or more refined results.

At 1114, the processor of a control subsystem or other processor determines whether additional refinements or adjustments to the spatial illumination patterns will be performed. For example, the processor may be programmed to perform a defined or set number of refinements or adjustments per sequence. Alternatively, the processor may determine whether additional refinements or adjustments are warranted in-real time, for instance based on an analysis of recent image data. For example, the processor may perform various image processing techniques to quantify an amount or percentage of distortion that appears in the image data and/or to quantify a clarity or preciseness of boundary or edge features detected in the image. The processor may compare such to some defined threshold. Where the boundary or edges are determined to be insufficiently clear or where too much distortion appears in the image, control may pass to 1116. Where the boundary or edges are determined to be sufficiently clear or where distortion in the image appears to be acceptable, control passes directly to 1120.

If further refinement or adjustment is deemed desirable, optionally at 1116, the processor of a control subsystem or other processor determines a second refined spatial illumination pattern based at least in part on determined approximate boundary. The second refined spatial illumination pattern will likely be spatially different than first refined spatial illumination pattern.

Optionally at 1118, the illumination subsystem emits the second refined spatial illumination pattern. Again, the illumination is emitted outward of the volume dimensioning system. Again, the illumination is preferably modulated to be distinguishable from any ambient light.

At 1120, a processor of a control subsystem or other processor determines at least approximate three-dimensional volume of target object based at least in part on illumination returned (e.g., three-dimensional image information including two-dimensional image and depth information) from at least target object when illuminated by at least one refined spatial illumination pattern. In some applications or implementations the processor may determine the three-dimensional volume based on a single sample, i.e., illumination returned from illumination by a single refined spatial illumination pattern, for example a last refined spatial illumination pattern in a sequence. In other applications or implementations, the processor may determine the three-dimensional volume based on two or more samples, e.g., illumination returned from illumination be two or more respective refined spatial illumination patterns. In yet other applications or implementations, the processor may additionally or alternatively employ a sample based on the initial spatial illumination pattern.

As set out above, volume dimensioning for any given target object includes a sequence of one or more illuminations and respective detections of returned illumination. In most instances, a sequence includes illumination with at least one initial spatial illumination pattern and with one or more refined spatial illumination patterns. The number of refined spatial illumination patterns in a sequence may be fixed or set, or may vary, for instance based on the results of prior illumination(s) in the sequence. In some instances, illumination with the initial spatial illumination pattern may produce sufficiently acceptable results, and hence the sequence may omit illumination with any refined spatial illumination patterns. Thus, the method 1100 may include an additional determination, occurring between determination of the approximate boundary at 1106 and determination of the first refined spatial illumination pattern at 1108. This additional determination may assess the quality of the image data, avoiding illumination using refined spatial illumination patterns in those instances where illumination with the initial spatial illumination pattern produced acceptable results.

Figure 12:
FIG. 12 is a flow diagram showing a low level method of operation in a volume dimensioning system including determining a refined spatial illumination pattern, according to one illustrated embodiment.

FIG. 12 shows a low level method 1200 of operation of a volume dimensioning system including determining a refined spatial illumination pattern, according to one illustrated embodiment. The method 1200 may be employed as part of performing the method 1100 (FIG. 11).

At 1202, a processor of a control subsystem or other processor determines one or more refined spatial illumination pattern(s) to reduce illumination of surfaces that are not part of target object. The processor determines such based on image information returned from a previous illumination, for example a previous illumination with an initial spatial illumination pattern, or a previous illumination with a prior refined spatial illumination pattern. The processor determines a refinement or adjustment that is intended to reduce distortion, allow features of the target object to be more clearly discerned in the image data as represented by the image data, to increase the accuracy of volume estimation. The processor may determine that distortion is associated with illumination in a particular direction or area, and refine or adjust the spatial illumination pattern so as to reduce the distortion in the returned illumination.

Figure 13:
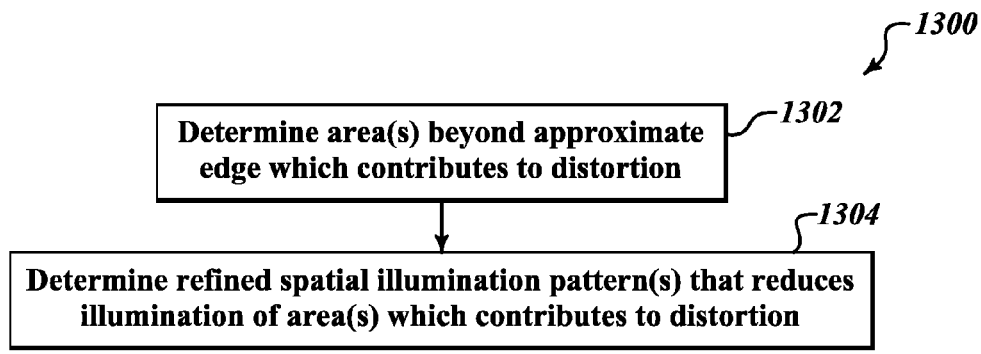
FIG. 13 is a flow diagram showing a low level method of operation in a volume dimensioning system including determining a refined spatial illumination pattern, according to one illustrated embodiment.

FIG. 13 shows a low level method 1300 of operation of a volume dimensioning system including determining a refined spatial illumination pattern, according to one illustrated embodiment. The method 1300 may be employed as part of performing the method 1100 (FIG. 11).

At 1302, a processor of a control subsystem or other processor determines one or more areas in an image which are beyond an approximate boundary or edge feature corresponding to the target object in the image, which areas contribute to distortion.

At 1304, the processor determines one or more refined spatial illumination pattern(s) that reduces illumination of to the areas in the environment which contribute to the distortion in the image data.

Figure 14:
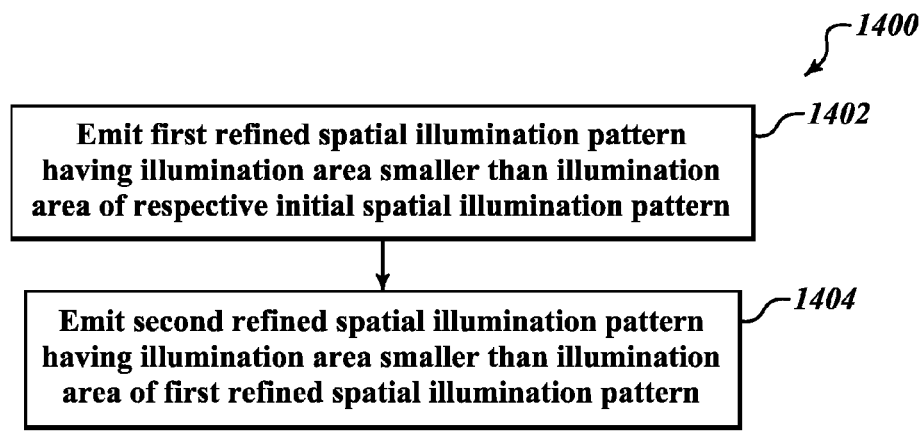
FIG. 14 is a flow diagram showing a low level method of operation in a volume dimensioning system including emitting first and second refined spatial illumination patterns during a volume dimensioning sequence, according to one illustrated embodiment.

FIG. 14 shows a low level method 1400 of operation of a volume dimensioning system emitting first and second refined spatial illumination patterns during a volume dimensioning sequence, according to one illustrated embodiment. The method 1400 may be employed as part of performing the method 1100 (FIG. 11).

At 1402, the illumination subsystem emits a first refined spatial illumination pattern having an illumination area smaller than an illumination area of a respective initial spatial illumination pattern. This may advantageously reduce the return (e.g., reflection) of illumination from surfaces other than the target object.

At 1404, the illumination subsystem emits a second refined spatial illumination pattern having an illumination area smaller than illumination area of the first refined spatial illumination pattern. This may advantageously further reduce the return (e.g., reflection) of illumination from surfaces other than the target object. As is evident from this description, the volume dimensioning system may make any number of refinements or adjustments to achieve the desired reduction in distortion and/or increase in accuracy.

Figure 15:
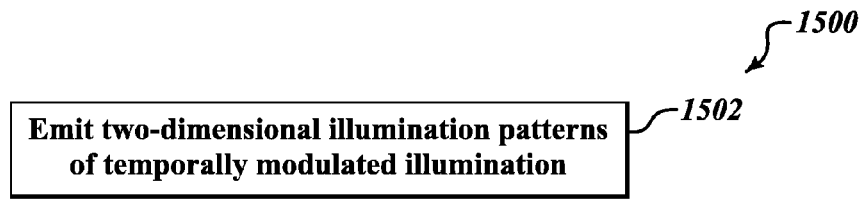
FIG. 15 is a flow diagram showing a low level method of operation in a volume dimensioning system including emitting illumination and selectively filtering such to produce two-dimensional illumination patterns of modulated illumination, according to one illustrated embodiment.

FIG. 15 shows a low level method 1500 of operation of a volume dimensioning system including emitting illumination and selectively filtering such to produce two-dimensional illumination patterns of modulated illumination, according to one illustrated embodiment. The method 1500 may be employed as part of performing the method 1100 (FIG. 11).

At 1502, a source of illumination such as a light source (e.g., LCD, LCoS) of the illumination subsystem emits two-dimensional illumination patterns of illumination, which preferably is modulated.

At 1504, a filter component (e.g., color filters, liquid crystal cells) selectively blocks and selectively passes the emitted illumination as a number of two-dimensional illumination patterns. Such may be accomplished via an LCD panel or device or an LCoS device.

Figure 16:
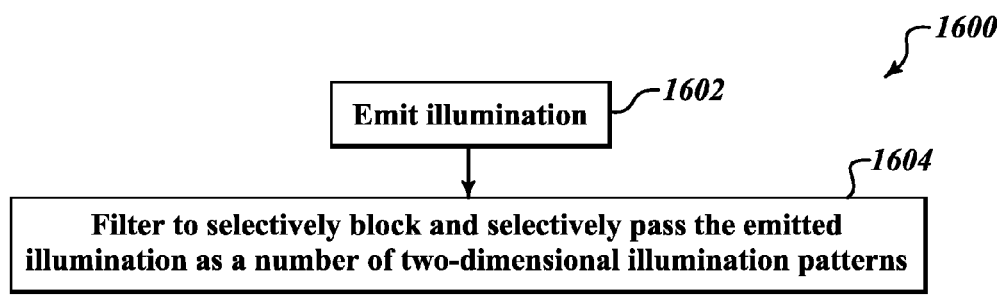
FIG. 16 is a flow diagram showing a low level method of operation in a volume dimensioning system including emitting illumination and selectively reflecting such to produce two-dimensional illumination patterns of modulated illumination, according to one illustrated embodiment.

FIG. 16 shows a low level method 1600 of operation of a volume dimensioning system including emitting illumination and selectively reflecting such to produce two-dimensional illumination patterns of modulated illumination, according to one illustrated embodiment. The method 1600 may be employed as part of performing the method 1100 (FIG. 11).

At 1602, a source of illumination such as a light source (e.g., LED(s), florescent, incandescent) of the illumination subsystem emits illumination.

At 1604, a reflective component (e.g., reflector, mirror, dichroic reflector) selectively reflects the emitted illumination as a number of two-dimensional illumination patterns. Such may be accomplished via an DMD.

Figure 17:
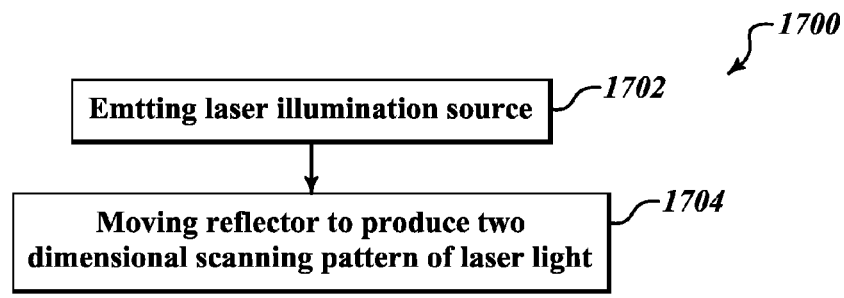
FIG. 17 is a flow diagram showing a low level method of operation in a volume dimensioning system including emitting illumination and selectively reflecting such, according to one illustrated embodiment.

FIG. 17 shows a low level method 1700 of operation of a volume dimensioning system including emitting illumination and selectively reflecting such, according to one illustrated embodiment. The method 1700 may be employed as part of performing the method 1100 (FIG. 11).

At 1702, a laser source emits laser illumination.

At 1704, one or more reflectors or mirrors move to reflect the laser illumination to produce a two-dimensional scanning pattern of laser light. The limits of travel of the reflectors or mirrors may be adjusted to control one or more dimensions of the resulting illumination pattern.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other automated systems, not necessarily the exemplary volume dimensioning system generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any computer-readable medium for use by or in connection with any processor-related system or method. In the context of this disclosure, a memory is a computer-readable medium that is an electronic, magnetic, optical, or other physical device or means that contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other nontransitory media.

Many of the methods described herein can be performed with one or more variations. For example, many of the methods may include additional acts, omit some acts, and/or perform or execute acts in a different order than as illustrated or described.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to U.S. patent application publication No. 2010/0220894; U.S. patent application Ser. No. 13/464,799 filed May 4, 2012 and U.S. patent application Ser. No. 13/465,968 filed May 7, 2012 are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A dimensioning system operable to dimension a target object, comprising
    an illumination subsystem operable to successively emit a number of sequences of spatial patterns of illumination toward the target object, each of the sequences including at least an initial spatial illumination pattern and at least one refined spatial illumination pattern subsequent to the respective initial spatial illumination pattern, the refined spatial illumination pattern spatially different than the respective initial spatial illumination pattern;

a sensor positioned to detect illumination returned from at least the target object; and a control subsystem communicatively coupled to the sensor and communicatively coupled to the illumination subsystem, and which determines an approximate boundary of at least a portion of the target object based at least in part of the detected illumination, determines the refined spatial illumination pattern based at least in part on the determined approximate boundary, causes the illumination subsystem to emit the at least one refined spatial illumination pattern, and determines an at least approximate volume of the target object based at least in part on illumination returned from at least the target object when illuminated by the at least one refined spatial illumination pattern.

2. The dimensioning system of claim 1 wherein the control subsystem determines the refined spatial illumination pattern based at least in part on the determined approximate boundary to reduce illumination of surfaces that are not part of the target object.

3. The dimensioning system of claim 1 wherein the approximate boundary includes at least one edge feature in an image of an illuminated area in which the target object is located and the control subsystem further determines at least one area beyond the approximate edge which contributes to distortion and determines the refined spatial illumination pattern to reduce illumination of the at least one area which contributes to distortion.

4. The dimensioning system of claim 1 wherein the sequences each include one initial spatial illumination pattern of modulated illumination and at least some of the sequences include at least two refined spatial illumination patterns of modulated illumination subsequent to the respective initial spatial illumination pattern, the refined spatial illumination patterns spatially different than the respective initial spatial illumination pattern and spatially different from one another.

5. The dimensioning system of claim 4 wherein a first one of the refined spatial illumination patterns has an area smaller than an illumination area of the respective initial spatial illumination pattern, and a second one of the refined spatial illumination patterns, subsequent to the first one of the refined spatial illumination patterns, has an illumination area smaller than the illumination area of the first one of the refined spatial illumination patterns.

6. The dimensioning system of claim 4 wherein the control subsystem causes the illumination subsystem to apply a temporal modulation of at least one of intensity or wavelength to the initial spatial illumination pattern and the at least two refined spatial illumination patterns.

7. The dimensioning system of claim 1 wherein the illumination subsystem includes an illumination source selectively actuatable to emit a number of two-dimensional spatial illumination patterns.

8. The dimensioning system of claim 1 wherein the illumination subsystem includes an illumination source actuatable to emit illumination and a filter actuatable to selectively block and selectively pass the emitted illumination as a number of two-dimensional spatial illumination patterns.

9. The dimensioning system of claim 1 wherein the illumination subsystem includes a laser illumination source and at least one scanning reflector operable to produce a two-dimensional scanning spatial pattern.

10. The dimensioning system of claim 1 wherein the illumination subsystem includes at least one of a liquid crystal display, a liquid crystal on silicon device or a digital micromirror device.

11. The dimensioning system of claim 1 wherein the sensor is a two-dimensional sensor is positioned to detect the illumination returned from the target object without use of parallax with another sensor and the control subsystem performs a time-of-flight analysis.

12. A method of operation in a dimensioning system to dimension a target object, the method comprising emitting an initial spatial illumination pattern of modulated illumination toward the target object by an illumination subsystem operable to successively emit a number of sequences of spatial patterns of illumination which are modulated, each of the sequences including at least the initial spatial illumination pattern and at least one refined spatial illumination pattern of modulated illumination subsequent to the respective initial spatial illumination pattern, the at least one refined spatial illumination pattern spatially different than the respective initial illumination pattern;

detecting by a sensor illumination returned from at least the target object; and determining by a control subsystem an approximate boundary of at least a portion of the target object based at least in part on the detected illumination;

determining by the control subsystem the at least one refined spatial illumination pattern based at least in part on the determined approximate boundary;

causing the illumination subsystem to emit the at least one refined spatial illumination pattern; and determining by the control subsystem an at least approximate three-dimensional volume of the target object based at least in part on illumination returned from at least the target object when illuminated by the at least one refined spatial illumination pattern.

13. The method of claim 12 wherein determining the refined spatial illumination pattern based at least in part on the determined approximate boundary includes determining the at least one refined spatial illumination pattern to reduce illumination of surfaces that are not part of the target object.

14. The method of claim 12 wherein the approximate boundary includes at least one edge feature in an image of an illuminated area in which the target object is located, and further comprising determining by the control subsystem at least one area beyond the approximate edge which contributes to distortion and wherein determining the at least one refined spatial illumination pattern includes determining the at least one refined spatial illumination pattern that reduces illumination of the at least one area which contributes to distortion.

15. The method of claim 12 wherein at least some of the sequences include at least a first and a second refined spatial illumination pattern subsequent to the respective initial spatial illumination pattern, the first and the second refined spatial illumination patterns spatially different than the respective initial spatial illumination pattern and different from one another, and wherein determining the at least one refined spatial illumination pattern based at least in part on the determined approximate boundary includes successively determining the first refined spatial illumination pattern and the second refined spatial illumination pattern, and causing the illumination subsystem to emit the at least one refined spatial illumination pattern includes causing the illumination subsystem to successively emit the first refined spatial illumination pattern and the second refined spatial illumination pattern, each of the first and the second refined spatial illumination patterns being modulated to be distinguishable from any ambient light.

16. The method of claim 15 wherein causing the illumination subsystem to successively emit the first refined spatial illumination pattern includes causing the illumination subsystem to emit the first refined spatial illumination pattern having an illumination area smaller than an illumination area of the respective initial spatial illumination pattern, and causing the illumination subsystem to successively emit the second refined spatial illumination pattern includes causing the illumination subsystem to successively emit the second refined spatial illumination pattern having an illumination area smaller than the illumination area of the first refined spatial illumination pattern.

17. The method of claim 12 wherein causing the illumination subsystem to emit the at least one refined spatial illumination pattern includes causing an illumination source to emit a number of two-dimensional illumination patterns of temporally modulated illumination.

18. The method of claim 12 wherein causing the illumination subsystem to emit the at least one refined spatial illumination pattern includes causing an illumination source to emit illumination and a filter to selectively block and selectively pass the emitted illumination as a number of two-dimensional illumination patterns.

19. The method of claim 12 wherein causing the illumination subsystem to emit the at least one refined spatial illumination pattern includes causing a laser illumination source and at least one scanning reflector to produce a two dimensional scanning pattern.

20. The method of claim 12 wherein causing the illumination subsystem to emit the at least one refined spatial illumination pattern includes supplying control signals to at least one of a liquid crystal display, a liquid crystal on silicon device or a digital micromirror device.

21. The method of claim 12 wherein determining an at least approximate three-dimensional volume of the target object based at least in part on illumination returned from at least the target object when illuminated by the at least one refined spatial illumination pattern includes determining the at least approximate three-dimensional volume of the target object based at least in part on a time-of-flight analysis of at least the emitted at least one refined spatial illumination pattern and the illumination returned from the target object when illuminated by the respective at least one refined spatial illumination pattern.

22. A time-of-flight based dimensioning system operable to dimension a target object, comprising
an illumination subsystem operable to successively emit a number of sequences of two-dimensional patterns of modulated illumination toward the target object, each of the sequences including at least an initial two-dimensional pattern of modulated illumination and at least one refined two-dimensional pattern of modulated illumination subsequent to the respective initial pattern of modulated illumination, the at least one refined two-dimensional pattern of modulated illumination spatially different than the respective initial two-dimensional pattern of modulated illumination;
a two-dimensional image sensor positioned to detect illumination returned from at least the target object; and
a control subsystem communicatively coupled to the image sensor to receive image information therefrom representative of the returned illumination, and which identifies edge features in the image information that correspond to physical edges of at least a portion of the target object, based at least in part on the identified edge features determines the at least one refined two-dimensional pattern of modulated illumination to reduce multipath reflection, causes the illumination subsystem to emit the at least one refined two-dimensional pattern of modulated illumination, and determines an at least approximate three-dimensional volume of the target object based at least in part on illumination returned from at least the target object when illuminated by the at least one refined two-dimensional pattern of modulated illumination.

23. The dimensioning system of claim 22 wherein the control subsystem further determines at least one area beyond the identified edge features which contributes to the multipath reflection and determines the refined two-dimensional pattern of modulated illumination to reduce illumination of the at least one area which contributes to multipath reflection.

24. The dimensioning system of claim 22 wherein the control subsystem determines at least two refined two-dimensional patterns of modulated illumination for each of at least one of the sequences, the at least two refined two-dimensional patterns of modulated illumination spatially different than the respective initial two-dimensional pattern of modulated illumination, a first one of the refined two-dimensional patterns of modulated illumination having a respective illumination area smaller than an respective illumination area of the initial two-dimensional pattern of modulated illumination and a second one of the refined two-dimensional patterns of modulated illumination having a respective illumination area smaller than the respective illumination area of the first one of the two-dimensional patterns of modulated illumination.

25. The dimensioning system of claim 22 wherein the control subsystem determines the at least approximate three-dimensional volume of the target object based at least in part on a time-of-flight analysis of at least the emitted at least one refined two-dimensional pattern of modulated illumination and the illumination returned from the target object when illuminated by the respective at least one refined two-dimensional pattern of modulated illumination.

* * * * *